(12) United States Patent
Nakamura

(10) Patent No.: US 6,522,480 B2
(45) Date of Patent: Feb. 18, 2003

(54) TAKING LENS APPARATUS

(75) Inventor: Hiroshi Nakamura, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/167,464

(22) Filed: Jun. 13, 2002

(65) Prior Publication Data

US 2002/0191307 A1 Dec. 19, 2002

(30) Foreign Application Priority Data

Jun. 15, 2001 (JP) .................................. 2001-181757

(51) Int. Cl.[7] .............................................. G02B 15/14
(52) U.S. Cl. ...................... 359/698; 396/104; 396/87; 396/79; 359/694
(58) Field of Search ......................... 359/694–698, 359/823; 396/379, 79, 85–87, 104

(56) References Cited

U.S. PATENT DOCUMENTS 5,369,461 A * 11/1994 Hirasawa et al. ........... 348/347
5,815,748 A * 9/1998 Hamamura et al. ......... 348/345
5,946,504 A * 8/1999 Hirasawa et al. ............. 396/80

FOREIGN PATENT DOCUMENTS

| JP | 55-076312 A | 6/1980 |
| JP | 62-247314 A | 10/1987 |
| JP | 7-060211 B2 | 6/1995 |

* cited by examiner

Primary Examiner—Evelyn A Lester
(74) Attorney, Agent, or Firm—Birch, Stewart, Kolasch & Birch, LLP

(57) ABSTRACT

The taking lens apparatus is capable of performing accurate focusing state determination by allowing optical adjustment of the focusing state determination optical system for the taking lens. The lens barrel of the taking lens apparatus comprises a focusing state determination lens barrel, which incorporates focusing state determination image-capturing elements, positions of which are adjustable by an operation ring.

4 Claims, 12 Drawing Sheets

TAKING LENS APPARATUS

BACKGROUND OF THE INVENTION

1. Field of the Invention

The present invention relates to a taking lens apparatus, and more particularly, to a taking lens apparatus comprising an optical system for focusing state determination and an image-capturing element.

2. Description of the Related Art

Japanese Patent Application Publication No. 55-76312 and Japanese Patent Publication No. 7-60211 disclose conventional methods for determining a focusing state (front-focusing, rear-focusing or just-focusing state) of a taking lens apparatus using a plurality of image-capturing elements with different optical path lengths from the taking lens. For example, for an image-capturing element for capturing video images (video image-capturing element), two focusing state determination image-capturing elements for capturing images in the same picture-taking range are placed in a position to which optical path length is longer and a position to which optical path length is shorter than that of the video image-capturing element, respectively. Then, focus estimation values for the respective image-capturing faces of the respective focusing state determination image-capturing elements are calculated and compared according to high frequency components of the video signals obtained from these focusing state determination image-capturing elements. Thus, the focusing state of the image-capturing face of the video image-capturing element is determined, that is, whether it is front-focusing, rear-focusing or just-focusing state according to a comparison between the focus estimation values. Such a focusing state determination method is applicable to focus determination for auto focusing, etc.

The object light for focusing state determination can be obtained by splitting video object light that passes through the taking lens. In this case, in addition to a usual picture-taking optical system, a focusing state determination optical system is constructed for the taking lens. Therefore, optical (mechanical) adjustments are required not only for the usual picture-taking optical system but also for the focusing state determination optical system at the time of factory shipment. Furthermore, when using the taking lens apparatus, the user may have to adjust the focusing state determination optical system due to manufacturing errors, etc. of the camera body.

SUMMARY OF THE INVENTION

The present invention has been implemented in view of the circumstances described above and it is an object of the present invention to provide a taking lens apparatus capable of easily adjusting the focusing state determination optical system and performing accurate focusing state determination.

To attain the above-described object, the present invention is directed to a taking lens apparatus to be mounted on a camera body, the taking lens apparatus comprising: a taking lens; a light splitting device which splits object light passing through the taking lens into focusing state determination object light and video object light entering a video image-capturing element of the camera body; focusing state determination image-capturing elements which capture images of the focusing state determination object light split by the light splitting device; a supporting device which movably supports the focusing state determination image-capturing elements so that optical path lengths for the focusing state determination object light entering the focusing state determination image-capturing elements are variable; and an adjusting device which adjusts positions of the focusing state determination image-capturing elements supported by the supporting device.

The present invention is also directed to a taking lens apparatus to be mounted on a camera body, the taking lens apparatus comprising: a taking lens; a light splitting device which splits object light passing through the taking lens into focusing state determination object light and video object light entering a video image-capturing element of the camera body; focusing state determination image-capturing elements which capture images of the focusing state determination object light split by the light splitting device; a relay lens placed on an optical path between the light splitting device and the focusing state determination image-capturing elements; a supporting device which supports the relay lens movably along an optical axis; and an adjusting device which adjusts a position of the relay lens supported by the supporting device.

Preferably, the taking lens apparatus further comprises: a main lens barrel which guides the video object light to the video image-capturing element; and a focusing state determination lens barrel which is branched from the main lens barrel and guides the focusing state determination object light to the focusing state determination image-capturing elements, the focusing state determination image-capturing elements being mounted on the focusing state determination lens barrel, wherein the adjusting device comprises an operation ring which is arranged on the focusing state determination lens barrel and adjusts the position of the focusing state determination image-capturing elements or the relay lens.

According to the present invention, there is provided the adjusting device for adjusting the focusing state determination optical system on the focusing state determination lens barrel branched from the main lens barrel, and the operator can easily adjust the focusing state determination optical system and perform accurate focusing state determination.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

With reference now to the attached drawings, a taking lens apparatus according to an embodiment of the present invention will be explained in detail below.

Figure 1:
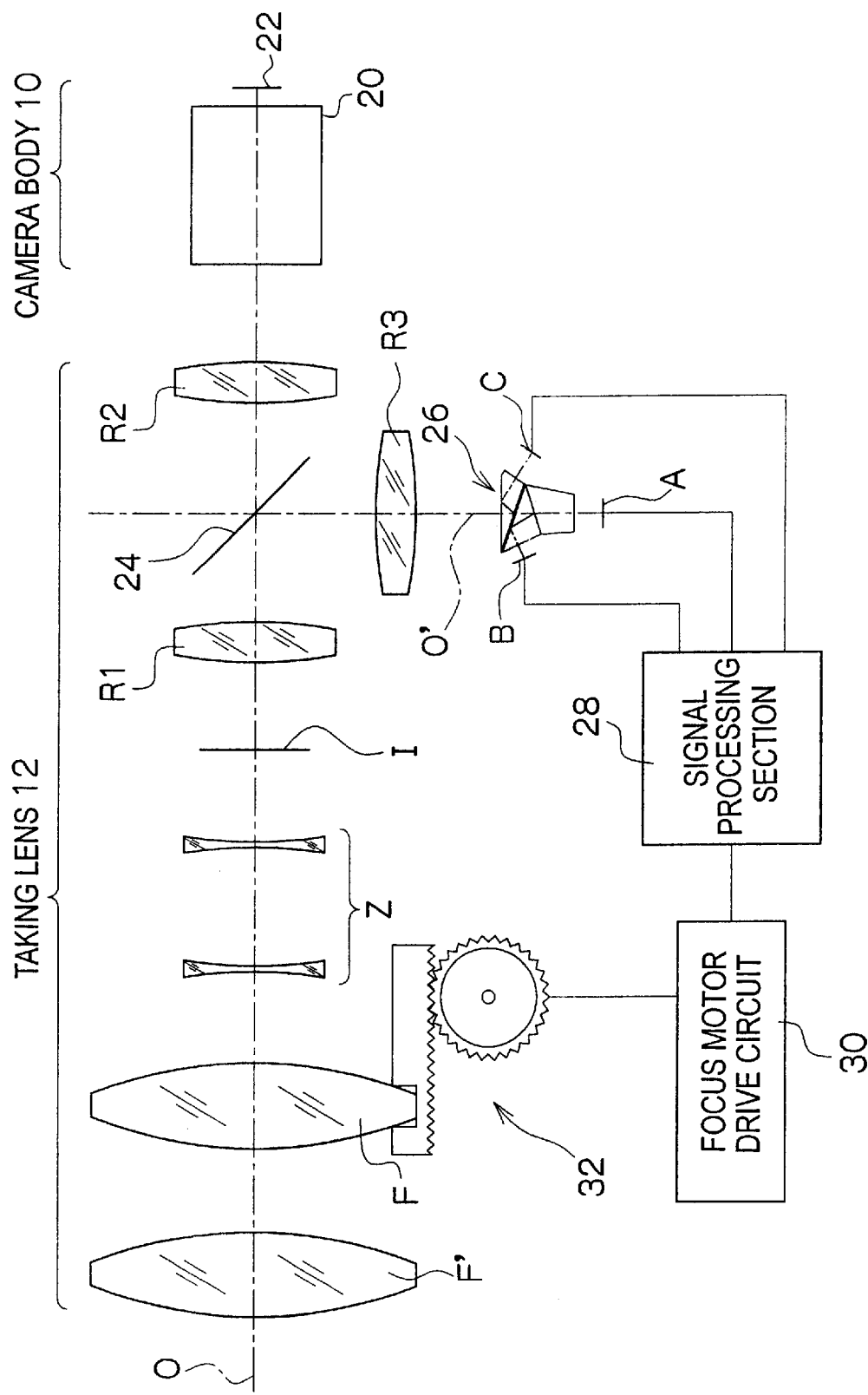
FIG. 1 is a block diagram showing a configuration of a television camera system using a taking lens apparatus according to the present invention.

FIG. 1 is a block diagram showing a configuration of a television camera system using a taking lens apparatus according to an embodiment of the present invention. The television camera system as shown in FIG. 1 comprises a camera body 10 and an interchangeable taking lens apparatus 12, etc. The camera body 10 incorporates an image-capturing element (video image-capturing element), which captures video images for televising and outputs video signals in a predetermined format or records in a recording medium, and required circuit, etc. On the other hand, the taking lens apparatus 12 is detachably mounted on a front side of the camera body 10 and, as publicly known, the optical system of the taking lens apparatus 12 is constructed of, starting with the front end side, a fixed focus lens F', a movable focus lens F, a zoom lens Z made up of a variable power system and correction system, an iris I, a relay lens (a relay optical system) made up of a front relay lens R1 and a rear relay lens R2. The configuration of each lens in the figure is simplified, and a group of a plurality of lenses may be represented by one lens.

Furthermore, as shown in FIG. 1, a semitransparent mirror or a beam splitter 24 is placed on the optical path of the object light between the front relay lens R1 and the rear relay lens R2 of the relay optical system. The beam splitter 24 is inclined approximately 45 degrees with respect to the optical axis O of the taking lens apparatus 12, and splits the object light (light flux) into transmitted light and reflected light.

Of the object light incident from the front end side of the taking lens apparatus 12, the light transmitted through the beam splitter 24, that is, the video object light goes out of the rear end side of the taking lens apparatus 12 and enters an image-capturing section 20 of the camera body 10. Detailed description for the image-capturing section 20 will be omitted, but the object light incident upon the image-capturing section 20 is separated into three colors, red, green and blue by, for example, a color separation optical system and entered into image-capturing faces of their respective image-capturing elements (video image-capturing elements) for the three colors. This allows televising color video images to be taken. A focus plane 22 is shown on the optical axis O of the taking lens apparatus 12 at a position that is optically equivalent to the positions of the image-capturing faces of the video image-capturing elements.

On the other hand, the light reflected by the beam splitter 24, that is, the object light for focusing state determination is led to a focusing state determination image-capturing section 26 along an optical axis O', which is quasi-perpendicular to the optical axis O of the taking lens apparatus 12. Here, the object light is quasi-parallel light between the front relay lens R1 and the rear relay lens R2, and the object light reflected by the beam splitter 24 passes through a relay lens R3, which focuses light and has a property similar to that of the rear relay lens R2, and enters the focusing state determination image-capturing section 26. When the optical axis O and the optical axis O' are particularly distinguished in the following explanations, the optical axis O is referred to as an optical axis O of the picture-taking optical system and the optical axis O' is referred to as an optical axis O' of the focusing state determination optical system.

Figure 2:
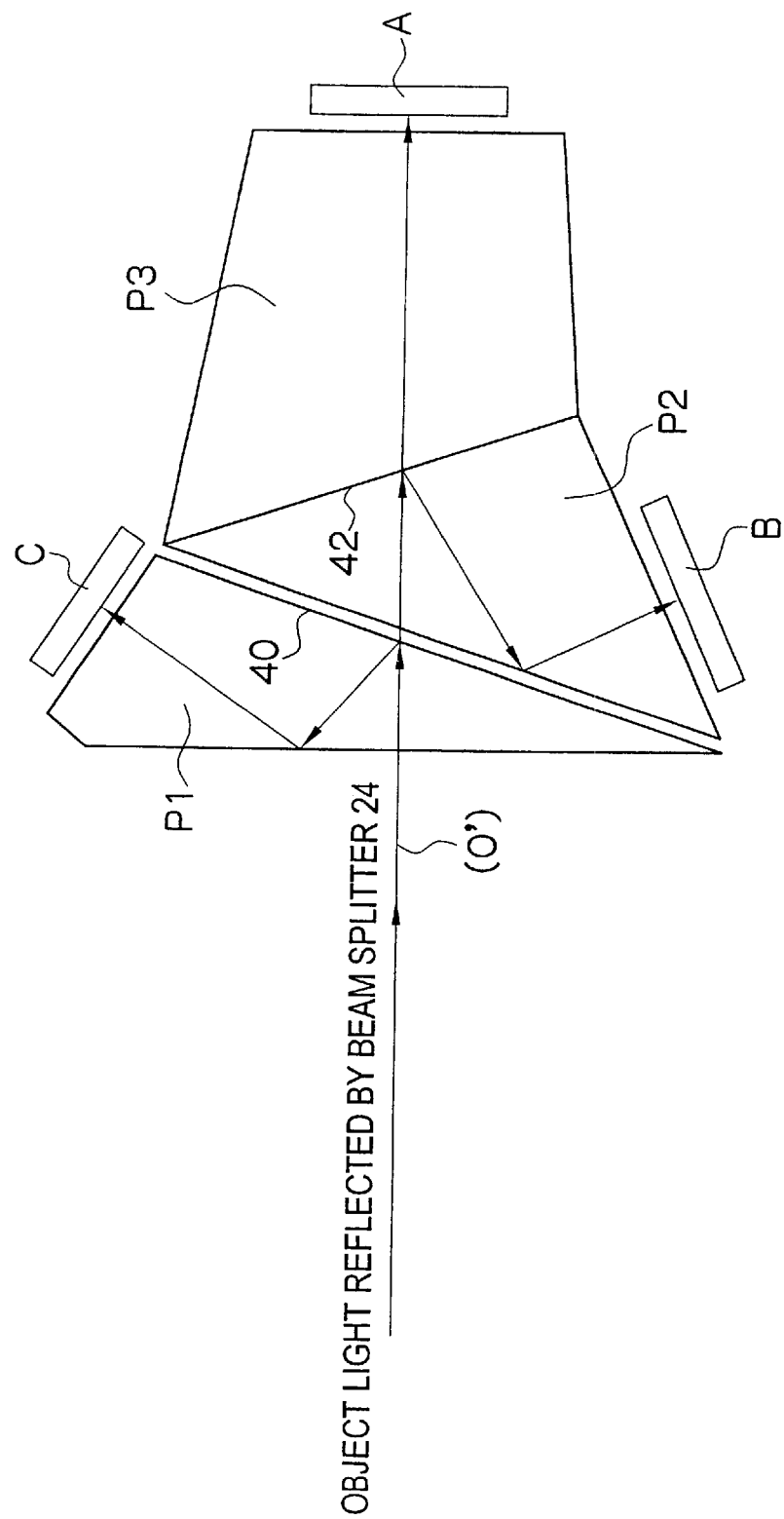
FIG. 2 is a block diagram showing a configuration of a focusing state determination image capturing section.

FIG. 2 is a block diagram showing a configuration of the image-capturing section 26. As shown in FIG. 2, the image-capturing section 26 is constructed of three prisms P1, P2 and P3 making up the light splitting optical system and three focusing state determination image-capturing elements (two-dimensional CCD) A, B and C. The object light, which is reflected by the beam splitter 24 as described above, propagates along the optical axis O' and enters the first prism P1, and is then split into reflected light and transmitted light by a beam splitter face 40 of the first prism P1. The light reflected by the beam splitter face 40 enters an image-capturing face of the image-capturing element C. On the other hand, the light transmitted through the beam splitter face 40 enters the second prism P2 and is further split into reflected light and transmitted light by a beam splitter face 42 of the second prism P2. The light reflected by the beam splitter face 42 enters an image-capturing face of the image-capturing element B. On the other hand, the light transmitted through the beam splitter face 42 enters an image-capturing face of the image-capturing element A. The object light is split by the beam splitter face 40 of the first prism P1 and the beam splitter face 42 of the second prism P2 so that the amounts of the object light incident upon the image-capturing elements A, B and C are equal. The focusing state determination image-capturing elements A, B and C in this embodiment are CCDs for capturing monochrome images.

Figure 3:
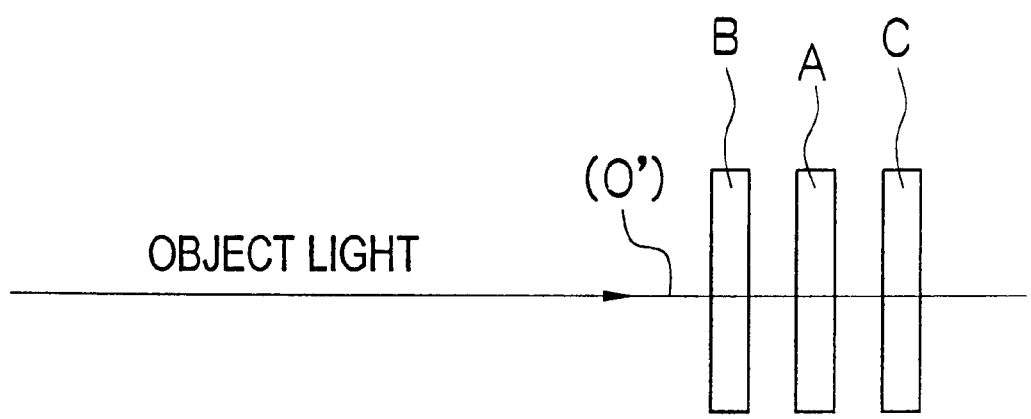
FIG. 3 illustrates focusing state determination image-capturing elements A, B and C on the same optical axis.

When the optical axes of the object light incident upon the image-capturing elements A, B and C (optical axes of image-capturing elements) are shown on the same straight line, for the object light incident upon the image-capturing elements A, B and C as shown in FIG. 3, the optical path length to the image-capturing element B is the shortest, the optical path length to the image-capturing element C is the longest and the optical path length to the image-capturing element A is intermediate between the optical path lengths to the image-capturing elements B and C. That is, the image-capturing faces of the image-capturing elements B and C are placed front and behind the image-capturing face of the image-capturing element A at equidistant positions. Furthermore, the image-capturing face of the image-capturing element A is conjugate with the focus plane 22 (see FIG. 1) of the camera body 10, that is, the optical path length to the image-capturing face of the image-capturing element A is equal with the optical path lengths to the image-capturing faces of the video image-capturing elements of the camera body 10 with respect to the object light incident upon the taking lens apparatus 12. By the way, the light splitting optical system for splitting the object light into the image-capturing elements A, B and C is not limited to the above-described configuration using the prisms P1 to P3.

The optical system in the above-described configuration allows images of the object light incident upon the taking lens apparatus 12 to be captured by the three focusing state determination image-capturing elements A, B and C with the different optical path lengths placed around the position conjugate with the focus plane 22 of the camera body 10.

Then, an outline of auto focus control based on focusing state determination will be explained. As shown in FIG. 1, images captured by the three image-capturing elements A, B and C of the focusing state determination image-capturing section 26 are taken in the signal processing section 28. The signal processing section 28 finds the position of the focus lens F (focus position) at which the focusing state of the taking lens apparatus 12 comes into sharp focus on the focus plane 22 of the camera body 10 according to the high frequency components of the images acquired from the image-capturing elements A, B and C as will be described later. The signal processing section 28 then outputs a control signal for instructing the focus lens F to move to the focus position to the focus motor drive circuit 30. The focus motor drive circuit 30 drives a focus motor, not shown, to move the focus lens F through a power transmission mechanism 32 made up of gears, etc. and set the focus lens F at the focus position specified by the signal processing section 28. Auto focus is controlled by performing this processing continually.

Figure 4:
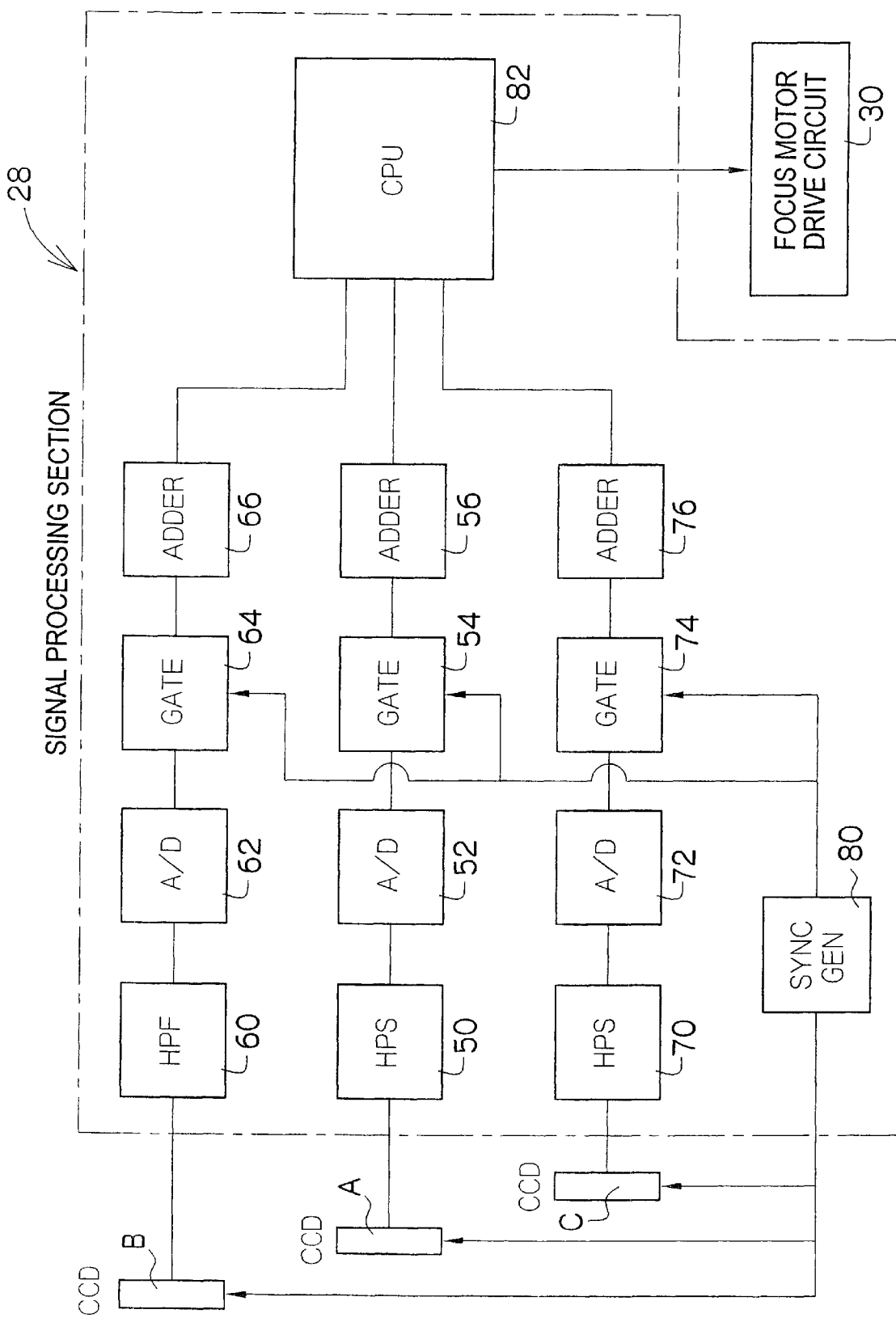
FIG. 4 is a block diagram showing a configuration of a signal processing section that performs focusing state determination processing.

Then, the configuration of the signal processing section 28 and focusing state determination processing will be explained below. FIG. 4 is a block diagram showing a configuration of the signal processing section 28. As shown in FIG. 4, the images of the object taken by the image-capturing elements A, B and C are output as video signals in a predetermined format, converted to focus estimation value signals which indicate image sharpness (image contrast) by high pass filters 50, 60 and 70, A/D converters 52, 62 and 72, gate circuits 54, 64 and 74 and adders 56, 66 and 76 constructed equally for the image-capturing elements A, B and C and entered into a CPU 82. The processing until a focus estimation value is calculated will be explained using the circuit provided for the image-capturing element A. Since the image-capturing element A in this embodiment is a CCD that captures monochrome images, the video signal output from the image-capturing element A is output as a brightness signal indicating brightness of respective pixels that make up the screen. The brightness signal output from the image-capturing element A is input to the high pass filter (HPF) 50 first and the high frequency component of the brightness signal is extracted. The signal with the high frequency component extracted by the HPF 50 is converted to a digital signal by the A/D converter 52. Then, of the digital signals corresponding to one screen (1 field) of the image captured by the image-capturing element A, only the digital signals corresponding to pixels within a predetermined focus area (e.g., central area of the screen) are extracted by the gate circuit 54 and then the values of the digital signals of the extracted range are added up by the adder 56. This gives a total of values of high frequency components of the brightness signal in the focus area. The value obtained by the adder 56 is a focus estimation value indicating the level of the sharpness of the image in the focus area.

A SYNC generation circuit 80 shown in FIG. 4 gives various SYNC signals to the image-capturing elements A, B and C and gate circuits 54, 64 and 74, etc. to establish synchronization among processes of the respective circuits. Furthermore, the SYNC generation circuit 80 gives the CPU 82 a vertical SYNC signal (V signal) for each field of the video signal.

Figure 5:
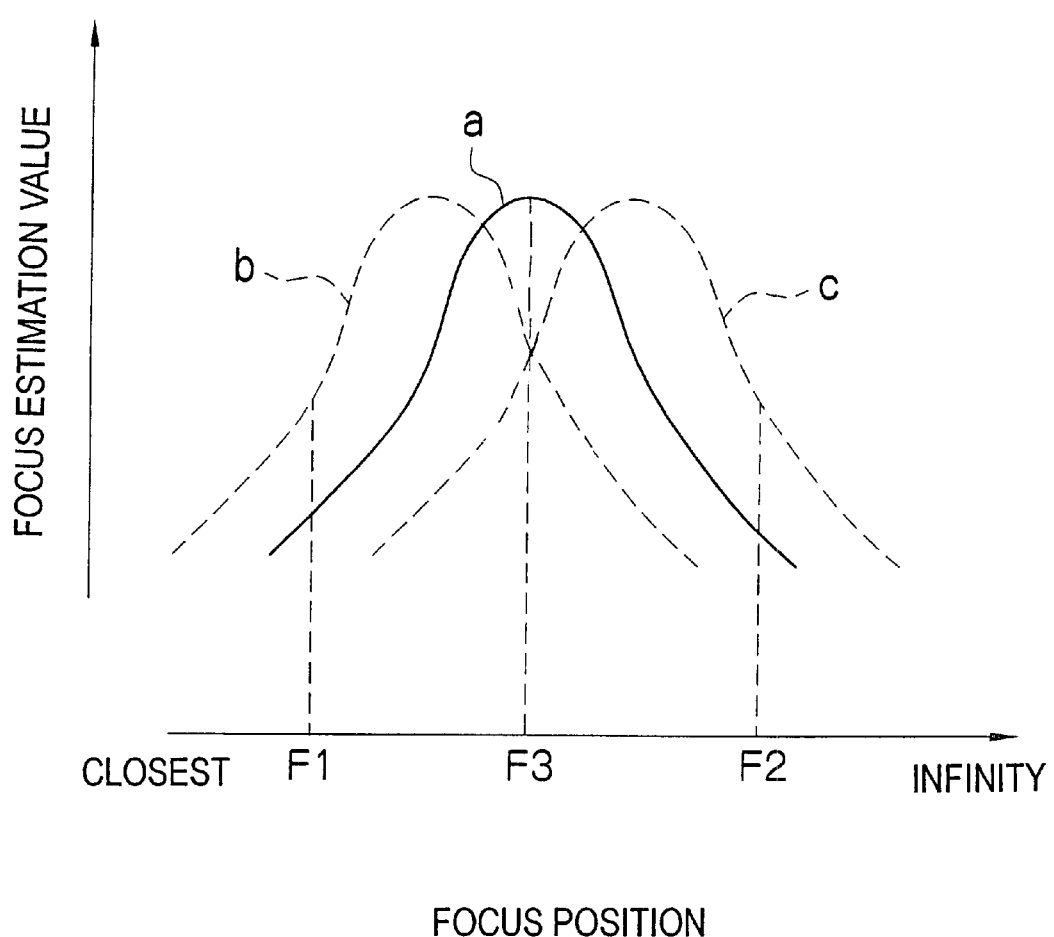
FIG. 5 illustrates focus estimation values at focusing state determination image-capturing elements with respect to focus positions at which an image of an object is captured.

As described above, the CPU 82 determines the current focusing state of the taking lens apparatus 12 with respect to the focus plane 22 of the camera body 10 according to the focus estimation values obtained from the image-capturing elements A, B and C. FIG. 5 illustrates focus estimation values versus focus positions at which images of an object are captured when the focus position of the taking lens apparatus 12 is expressed on the horizontal axis and the focus estimation value is expressed on the vertical axis. In the figure, a curve a shown with solid line indicates a focus estimation value obtained from the image-capturing element A in a position conjugate with the focus plane 22 of the camera body 10 with respect to the focus position, curves b and c expressed with broken line indicate focus estimation values obtained from the image-capturing elements B and C with respect to their respective focus positions.

In FIG. 5, a focus position F3 at which the focus estimation value of the curve a reaches a maximum is a focusing position. Now suppose the focus position of the taking lens apparatus 12 is set at the position F1 in the figure. At this time, the focus estimation values obtained from the image-capturing elements A, B and C are values corresponding to the focus position F1 on the curves a, b and c. Since the focus estimation value obtained from the image-capturing element B is at least larger than the focus estimation value obtained from the image-capturing element C, it is understandable that the focus position is set closer than the focus position F3 that is the focusing position, that is, a front-focusing state.

On the other hand, suppose the focus position of the taking lens apparatus 12 is set at the position of F2 in the figure, the focus estimation values obtained from the respective image-capturing elements A, B and C are the values corresponding to the focus position F2 on the curves a, b and c. Since the focus estimation value obtained from the image-capturing element C is at least larger than the focus estimation value obtained from the image-capturing element B, it is understandable that the focus position is set at a point at infinity from the focus position F3 that is the focusing position, that is, a rear-focusing state.

If the focus position of the taking lens apparatus 12 is set at the focusing position of F3 in the figure, the focus estimation values obtained from the respective image-capturing elements A, B and C are values corresponding to the focus position F3 on the curves a, b and c. At this time, since the focus estimation value obtained from the image-capturing element B is equal to the focus estimation value obtained from the image-capturing element C, it is understandable that the focus position is set at the focus position F3, that is, a just-focusing state.

Thus, it is possible to determine whether a focusing state at a current focus position of the taking lens apparatus 12 is in a front-focusing, rear-focusing or just-focusing state according to focus estimation values obtained from the image-capturing elements A, B and C. On the other hand, such a focusing state determination method only requires focus estimation values obtained from the image-capturing elements B and C and not a focus estimation value obtained from the image-capturing element A. Thus, this embodiment directly determines the focus positions at which the taking lens apparatus 12 is in the just-focusing state by effectively utilizing the focus estimation values obtained from the three image-capturing elements A, B and C as follows.

Figure 6:
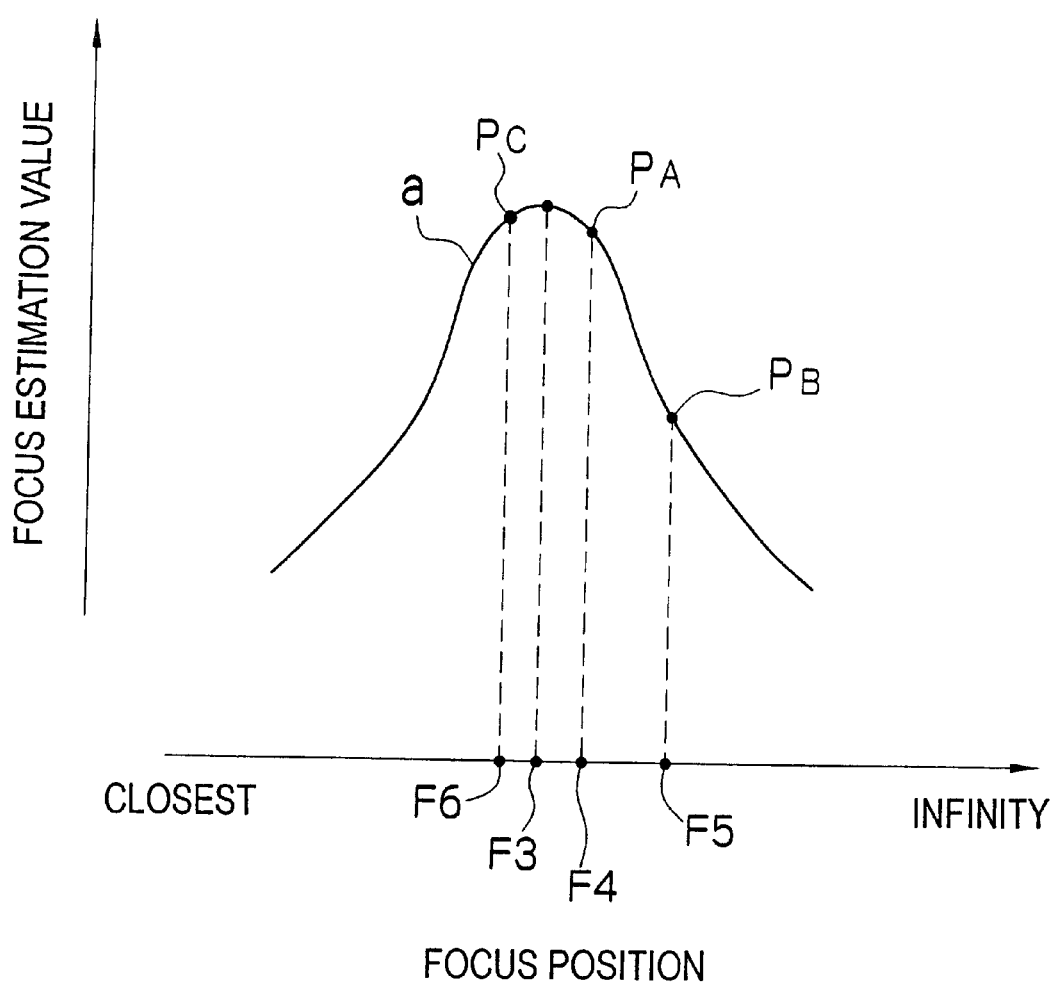
FIG. 6 illustrates focusing state determination processing by three focusing state determination image-capturing elements.

In FIG. 5 above, since the curves a, b and c about focus estimation values obtained from the image-capturing elements A, B and C have almost the same shape, focus estimation values obtained from the image-capturing elements B and C at a focus position can be considered as a focus estimation value of the image-capturing element A at a focus position which is shifted by a predetermined amount from the focus position. For example, suppose a focus position is set at F4 on the curve a of focus estimation values of the image-capturing element A shown in FIG. 6. At this time, the focus estimation value obtained from the image-capturing element A indicates the value of $P_A$ on the curve a. On the other hand, the focus estimation value obtained from the image-capturing element B indicates a value at $P_B$ on the curve a at the focus position F5 which is shifted by a predetermined value toward a point at infinity from the focus position F4, while the focus estimation value obtained from the image-capturing element C indicates a value at $P_C$ on the curve a at the focus position F6 which is shifted by a predetermined value toward the closest side from the focus position F4. By the way, the difference between the focus position F4 and focus position F5, that is, the amount of shift with respect to the focus estimation value obtained from the image-capturing element B is equal to the difference between the focus position of the maximum point on the curve b and the focus position of the maximum point on the curve a in FIG. 5, while the difference between the focus position F4 and focus position F6, that is, the amount of shift with respect to the focus estimation value obtained from the image-capturing element C is equal to the difference between the focus position of the maximum point on the curve c and the focus position of the maximum point on the curve a in FIG. 5.

On the other hand, the curve a can be approximated with a predetermined function (e.g., quadratic curve). Therefore, it is possible to specifically identify the curve a from focus estimation values at three points $P_A$, $P_B$ and $P_C$ obtained from the image-capturing elements A, B and C and find the focusing position F3 at which the focus estimation value becomes a maximum on the curve a.

When the CPU 82 shown in FIG. 1 determines the focus position at which the taking lens apparatus 12 is in the just-focusing state according to the focus estimation values obtained from the image-capturing elements A, B and C in this way, the CPU sends a control signal to the focus motor drive circuit 30 to instruct to move the focus lens F to the focus position. Auto focus control is performed in this way.

Figure 7:
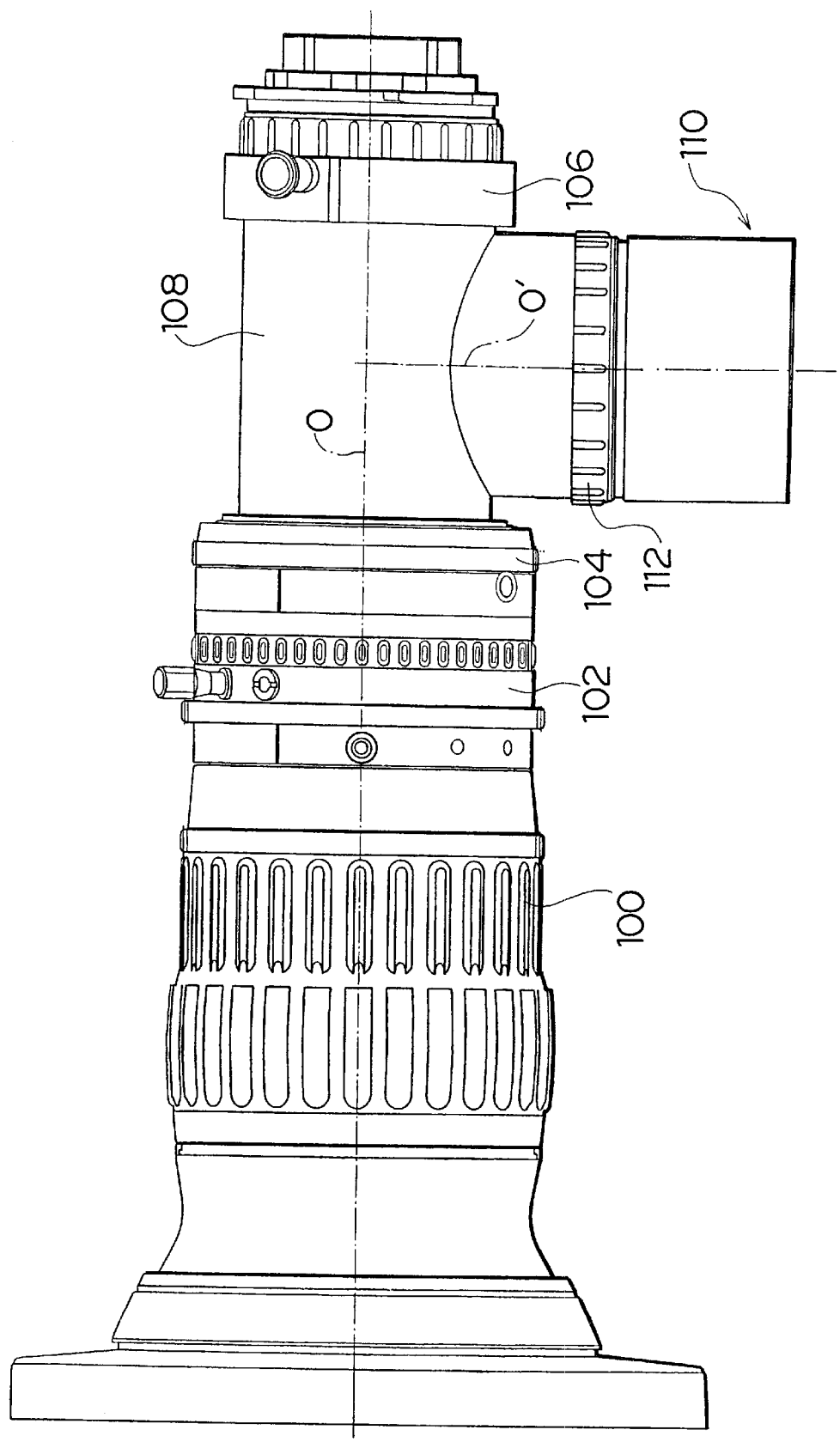
FIG. 7 is a side view showing an appearance of the lens barrel of the taking lens apparatus according to the present invention.

Then, the configuration of a lens barrel of the above-described taking lens apparatus 12 will be explained. FIG. 7 is a side view showing an appearance of the lens barrel of the taking lens apparatus 12. As shown in FIG. 7, the lens barrel of the taking lens apparatus 12 is provided, starting with the front end side, with a focus ring 100, a zoom ring 102, an iris ring 104 and a flange back adjustment ring 106, all of which are turnable. Turning the focus ring 100 causes the focus lens F in FIG. 1 to move along the optical axis O and turning the zoom ring 102 causes the zoom lens Z in FIG. 1 to move along the optical axis O. Turning the iris ring 104 causes the iris 1 in FIG. 1 to open or close, and turning the flange back adjustment ring 106 causes the rear relay lens R2 in FIG. 1 to move along the optical axis O.

Furthermore, the lens barrel 108 between the iris ring 104 and flange back adjustment ring 106 comprises a focusing state determination lens barrel 110 along the optical axis O' of the focusing state determination optical system which is perpendicular to the optical axis O of the picture-taking optical system. An operation ring 112 is turnably mounted on the focusing state determination lens barrel 110 to adjust the optical path length of the object light for focusing state determination until it enters the image-capturing faces of the respective image-capturing elements A, B and C. That is, turning the operation ring 112 allows the image-capturing face of the focusing state determination image-capturing element A to be positioned accurately at a position conjugate with the focus plane 22 of the camera body 10 shown in FIG. 1. The focusing state determination lens barrel 110 is placed face down when the taking lens apparatus 12 is mounted in the camera body 10, but can be placed in any direction.

Figure 8:
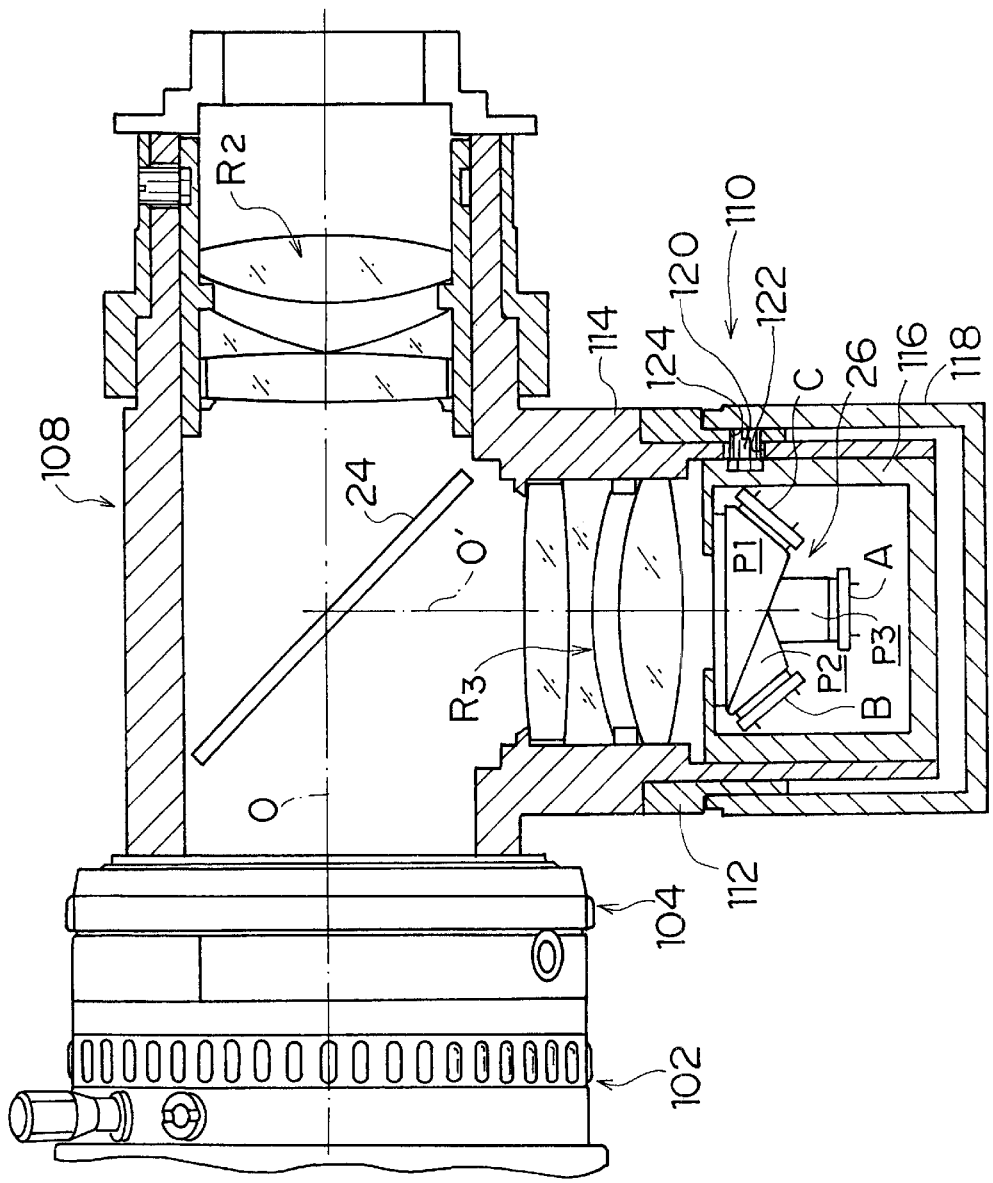
FIG. 8 is an enlarged view of key components showing a configuration of the focusing state determination lens barrel.

FIG. 8 is an enlarged view of key components showing a configuration of the focusing state determination lens barrel 110. As shown in FIG. 8, the rear relay lens (group) R2 shown in FIG. 1 is placed at the rear end of the picture-taking optical system along the optical axis O and the beam splitter 24 is placed in front thereof. The lens barrel 108 in which the beam splitter 24 is placed has a fixed cylinder 114 protruding in the direction of the optical axis O' of the focusing state determination lens barrel 110 forming one body with the fixed cylinder of the picture-taking optical system in the direction of the optical axis O.

Inside the fixed cylinder 114, the relay lens (group) R3 shown in FIG. 1 which forms images from the object light for focusing state determination reflected by the beam splitter 24 is fixed at the base end, while the prisms P1 to P3 shown in FIG. 1 and FIG. 2 and the focusing state determination image-capturing section 26 made up of the image-capturing elements A to C are placed at the other end supported inside a frame 116 in such a way as to be movable along the optical axis O'. On the other hand, the above-described operation ring 112 is turnably fitted on the fixed cylinder 114, and an external cylinder 118 is attached in such a way as to cover a part of the perimeter of the operation ring 112 and the end of the fixed cylinder 114. The external cylinder 118 is fixed to the fixed cylinder 114 using screws, etc.

Figure 9:
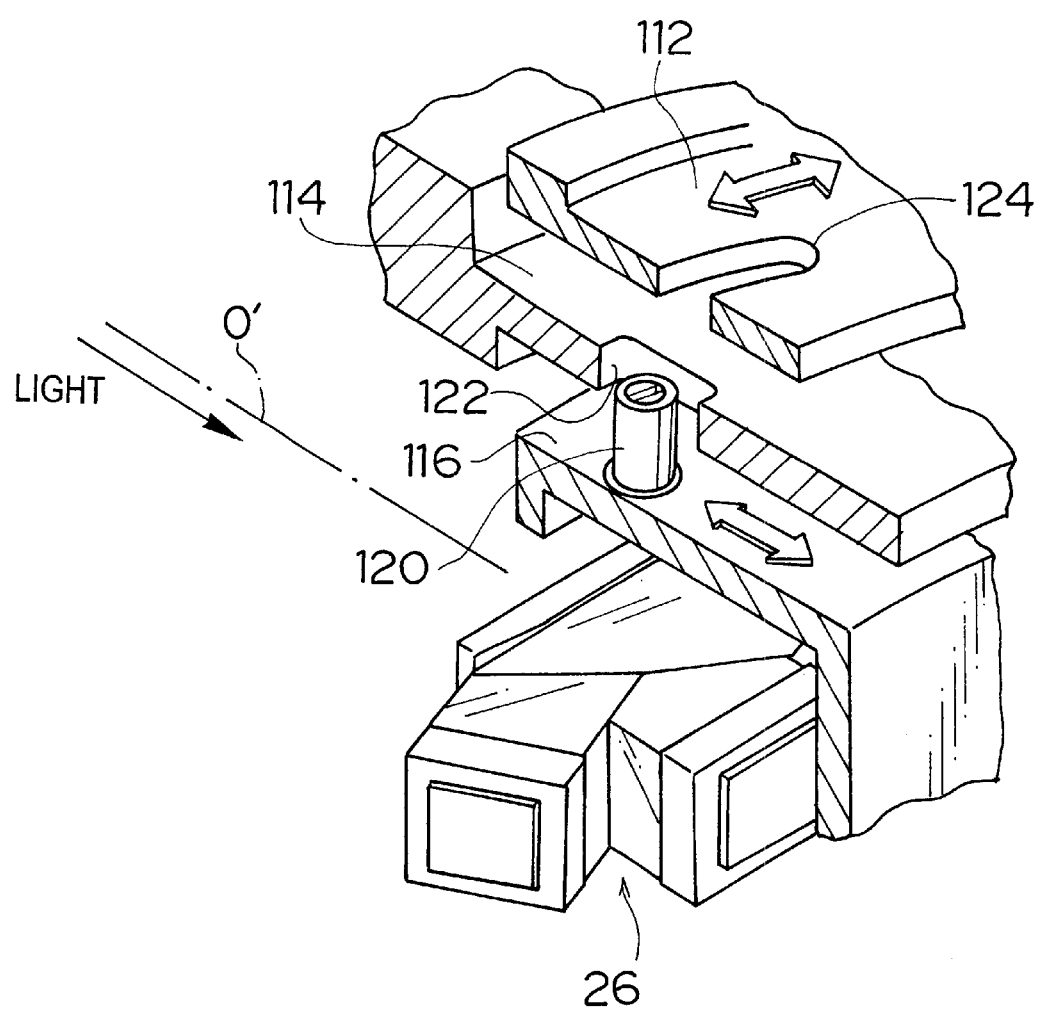
FIG. 9 is an exploded perspective view showing the configuration of the focusing state determination lens barrel.

Moreover, as shown in the exploded perspective view of FIG. 9, a pin 120 is attached to the external surface of the frame 116 that supports the image-capturing section 26 and a long groove is formed in the fixed cylinder 114 in the direction of the optical axis O' to insert and guide the pin 120 in the direction of the optical axis O'. Furthermore, a cum groove 124 is formed in the operation ring 112, which allows the pin 120 to pass through and which moves the position of the pin 120 in the direction of the optical axis O' as the operation ring 112 turns.

Therefore, when the operation ring 112 is turned, the position at which the above-described cum groove 124 intersects with the rectilinear propagation groove 112 changes in the direction of the optical axis O' and the pin 120 moves along the optical axis O' together. This causes the image-capturing section 26 to move along the optical axis O' together with the frame 116. Since the position of the image-capturing section 26 is adjustable along the optical axis O', it is possible to adjust the image-capturing face of the image-capturing element A of the image-capturing section 26 exactly to a position conjugate with the focus plane 22 of the camera body 10.

Loosening a screw, which is not shown, of the operation ring 112 makes the operation ring 112 turnable with respect to the fixed cylinder 114 and tightening the screw makes it possible to regulate the rotation thereof. After the operation ring 112 is turned and the image-capturing section 26 is adjusted in an appropriate position, it is possible to fix the image-capturing section 26 in the position.

Figure 10:
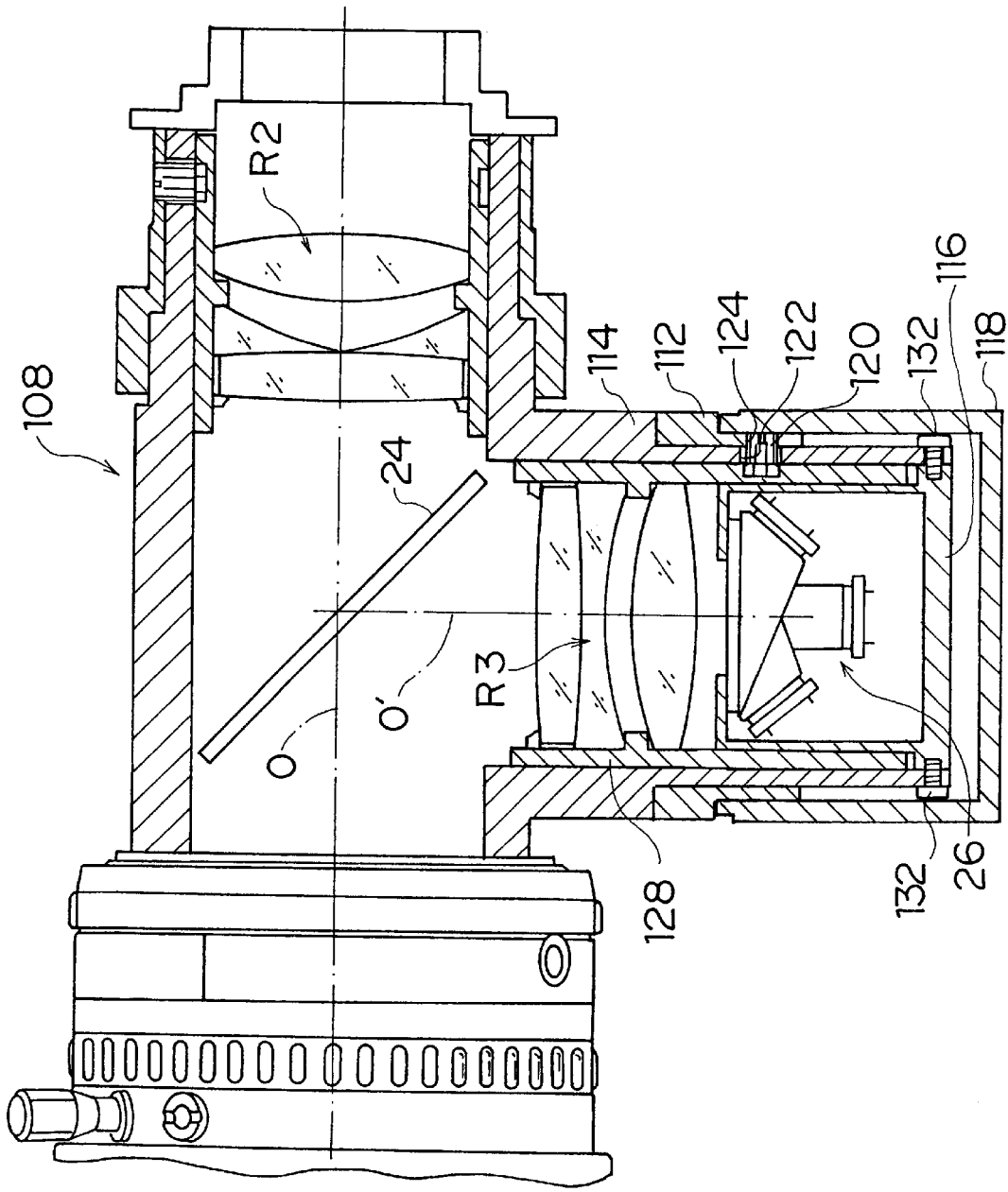
FIG. 10 is an enlarged cross-sectional view showing a configuration of another embodiment of the focusing state determination lens barrel.

FIG. 10 is a cross-sectional view comparable to FIG. 8 showing a case where the appearance remains the same as that in FIG. 7 and the position of the relay lens R3 is made adjustable instead of adjusting the image-capturing section 26, making it possible to achieve the same effect of adjusting the position of the image-capturing section 26 by adjusting the image-forming position of the object light for focusing state determination. Here, components identical or similar to those in FIG. 8 are assigned the same reference numerals and explanations thereof will be partially omitted. As shown in FIG. 10, the relay lens R3 is supported on the frame 128 in such a way as to be movable along the optical axis O' inside the fixed cylinder 114. On the other hand, the frame 116 that supports the image-capturing section 26 is fixed to a predetermined position inside the fixed cylinder 128 by means of screws 132, 132. The pin 120 fitted in the frame 116 of the image-capturing section 26 in FIG. 8 above is fitted in the frame 128 of the relay lens R3 in this embodiment. Therefore, when the operation ring 112 is turned, the pin 120 moves along the rectilinear propagation groove 122 of the fixed cylinder 114 along the optical axis O' following the movement of the cum groove 124 of the operation ring 112 and the relay lens R3 moves along the optical axis O' together with the frame 128.

Figure 11:
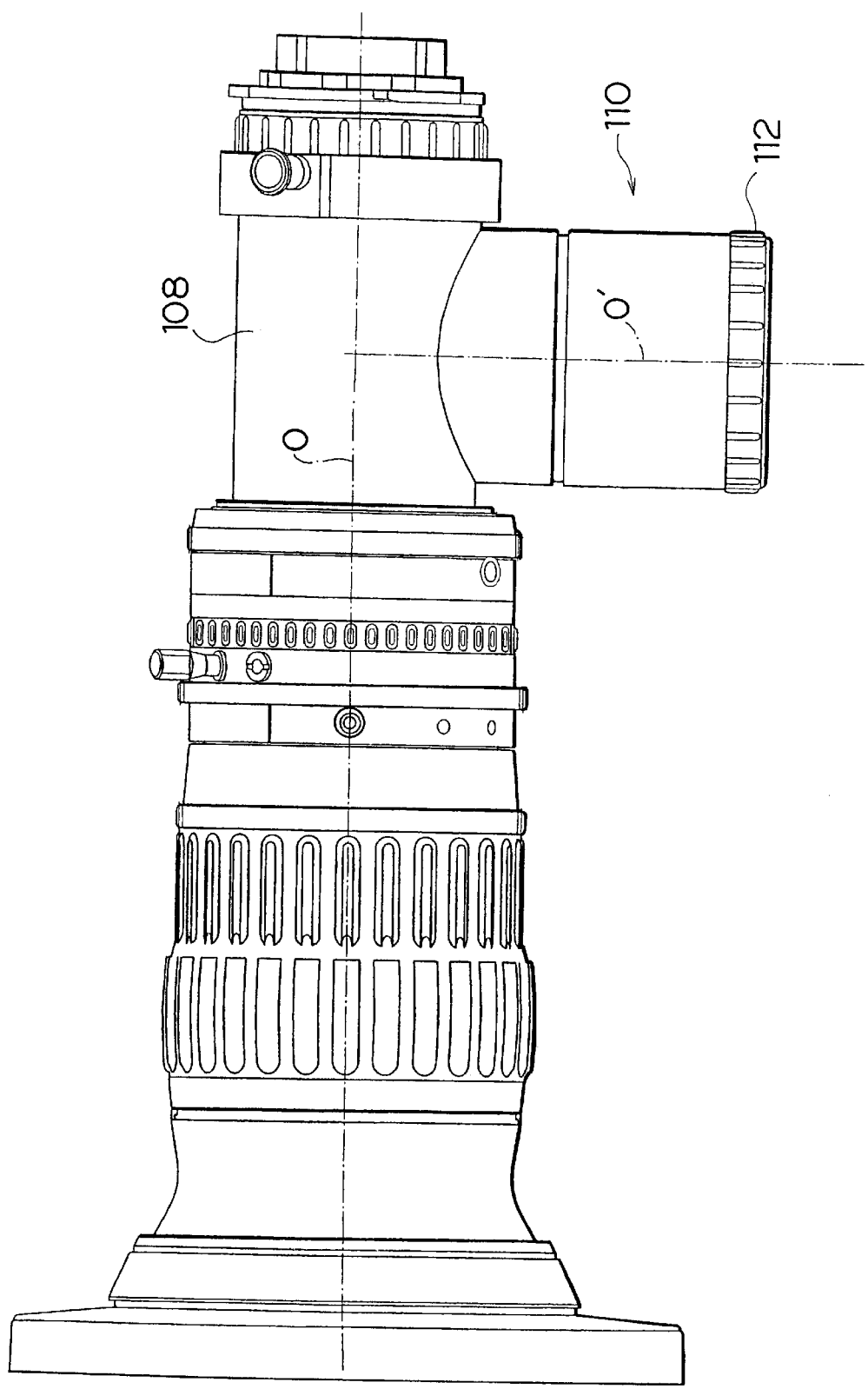
FIG. 11 is an external view of a taking lens apparatus showing a case where an operation ring is placed at the end of the focusing state determination lens barrel.

By the way, the above-described ring 112 can also be placed at the end of the focusing state determination lens barrel 110 as shown in FIG. 11 instead of placing it in an intermediate part of the focusing state determination lens barrel 110 as described above.

Figure 12:
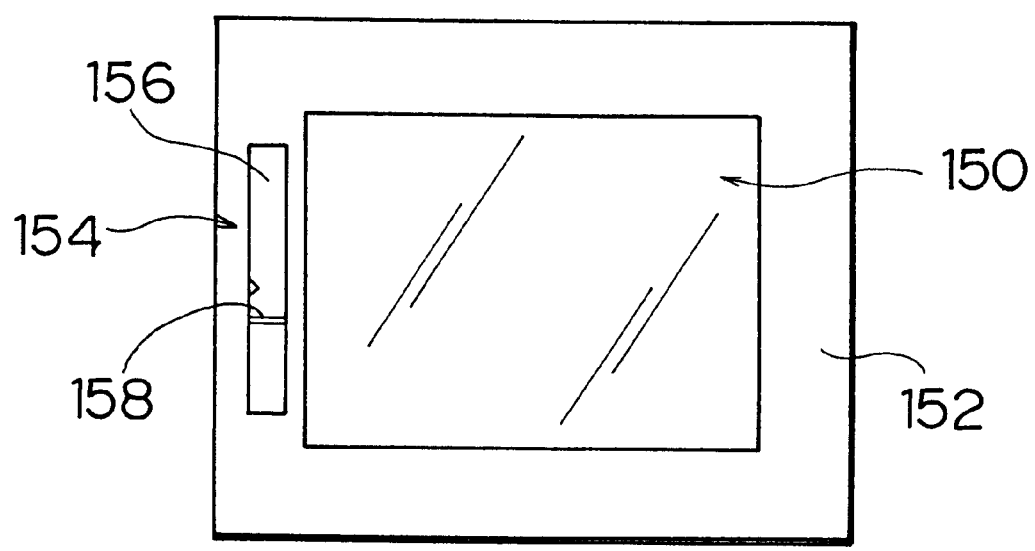
FIG. 12 illustrates an example of a display that displays a focusing state.

Then, an example of the procedure for optical adjustment of the focusing state determination optical system constructed in the above-described focusing state determination lens barrel 110 will be explained. First, instead of using the information of a focusing state determined at the signal processing section 28 in FIG. 1 for auto focus control, the information is displayed on a predetermined display. For example, as shown in FIG. 12, a display 154 is placed in a frame section 152 of a view finder 150 which shows an image taken by the video image-capturing element of the camera body 10 and the display 154 displays the focusing state determined by the above-described signal processing section 28. The display 154 comprises an oblong indicator 156 to display a horizontal bar 158 and when this horizontal bar 158 is in the middle of the indicator, it indicates a focusing state and when the bar is displaced above or below the center, it indicates a front-focusing or rear-focusing state. The greater the displacement of the horizontal bar 158 from the center is, the greater the amount of shift from the just-focusing state is.

Then, a picture of an object is taken and the focus ring 100 of the taking lens apparatus 12 is manually operated so that the object comes into focus. Whether the object is in focus or not is determined according to the image captured by the video image-capturing element. Then, the above-described operation ring 112 is turned so that the focusing state display comes into focus and the operation ring 112 is fixed at that position. This allows the image-capturing face of the focusing state determination image-capturing element A to be adjusted to a position conjugate with the image-capturing face of the video image-capturing element (focus plane 22 of the camera body 10).

As shown above, this embodiment has described the case where the image-capturing faces of the image-capturing element B and an image-capturing element C are placed at positions before and after the focusing state determination image-capturing element A located at a position conjugate with the focus plane 22 of the camera body 10 where the image-capturing elements B and C are optically equidistant from the image-capturing element A, but it would be sufficient if the image-capturing elements A, B and C are placed so that their respective optical path lengths differ from one another and at least any one of the image-capturing elements A, B and C is placed at a position to which the optical path length is longer and another one is shorter with respect to a position conjugate with the focus plane 22 of the camera body 10. That is, as described above, when a focus estimation value obtained from the image-capturing element B or C at a focus position is regarded as a focus estimation value of the image-capturing element A at a focus position displaced by a predetermined amount of shift from the focus position, the amount of shift can be set according to the distance of the image-capturing element B or C from the image-capturing element A. Furthermore, as the method for calculating the amount of shift, for example, the focus position is changed while taking pictures of a fixed object and a focus position at which a focus estimation value obtained from the image-capturing element A, B or C becomes a maximum is determined. Then, for the focus position at which the focus estimation value obtained from the image-capturing element A becomes a maximum, the amount of displacement of each focus position at which the focus estimation value obtained from the image-capturing element B or C becomes a maximum is determined and the amount of displacement is regarded as the amount of shift described above.

Furthermore, in the above-described embodiment, three focusing state determination image-capturing elements A, B and C are placed in the image-capturing section 26, but it is also possible to determine whether the focusing state is front-focusing, rear-focusing or just-focusing by placing only the two focusing state determination image-capturing elements B and C at positions before and after the position conjugate with the focus plane 22 of the camera body 10 and perform auto focus control based on the determination result. On the contrary, it is also possible to place at least one image-capturing element at a position to which the optical path length is longer and another position to which the optical path length is shorter with respect to a position conjugate with the focus plane 22 of the camera body 10 using four or more focusing state determination image-capturing elements with different optical path lengths so as to determine the focusing position more accurately.

Furthermore, the above-described embodiment has described the case where a determined focusing state is applied to auto focus, but the present invention is not limited to this, and can also be used for other purposes, for example, to display the focusing state.

As described above, the taking lens apparatus of the present invention provides an adjusting device, which adjusts the focusing state determination optical system for the taking lens apparatus, and can thereby easily adjust the focusing state determination optical system, allowing accurate focusing state determination.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A taking lens apparatus to be mounted on a camera body, the taking lens apparatus comprising:
   a taking lens;
   a light splitting device which splits object light passing through the taking lens into focusing state determination object light and video object light entering a video image-capturing element of the camera body;
   focusing state determination image-capturing elements which capture images of the focusing state determination object light split by the light splitting device;

a supporting device which movably supports the focusing state determination image-capturing elements so that optical path lengths for the focusing state determination object light entering the focusing state determination image-capturing elements are variable; and an adjusting device which adjusts positions of the focusing state determination image-capturing elements supported by the supporting device.

2. The taking lens apparatus according to claim 1, further comprising:

a main lens barrel which guides the video object light to the video image-capturing element; and a focusing state determination lens barrel which is branched from the main lens barrel and guides the focusing state determination object light to the focusing state determination image-capturing elements, the focusing state determination image-capturing elements being mounted on the focusing state determination lens barrel, wherein the adjusting device comprises an operation ring which is arranged on the focusing state determination lens barrel and adjusts the position of the focusing state determination image-capturing elements.

3. A taking lens apparatus to be mounted on a camera body, the taking lens apparatus comprising:

a taking lens;

a light splitting device which splits object light passing through the taking lens into focusing state determination object light and video object light entering a video image-capturing element of the camera body;

focusing state determination image-capturing elements which capture images of the focusing state determination object light split by the light splitting device;

a relay lens placed on an optical path between the light splitting device and the focusing state determination image-capturing elements;

a supporting device which supports the relay lens movably along an optical axis; and an adjusting device which adjusts a position of the relay lens supported by the supporting device.

4. The taking lens apparatus according to claim 3, further comprising:

a main lens barrel which guides the video object light to the video image-capturing element; and a focusing state determination lens barrel which is branched from the main lens barrel and guides the focusing state determination object light to the focusing state determination image-capturing elements, the focusing state determination image-capturing elements being mounted on the focusing state determination lens barrel, wherein the adjusting device comprises an operation ring which is arranged on the focusing state determination lens barrel and adjusts the position of the relay lens.

* * * * *